A. J. ADAMS.
PERAMBULATOR OR BABY CARRIAGE.
APPLICATION FILED MAY 22, 1917.
1,271,986.
Patented July 9, 1918.
2 SHEETS—SHEET 2.
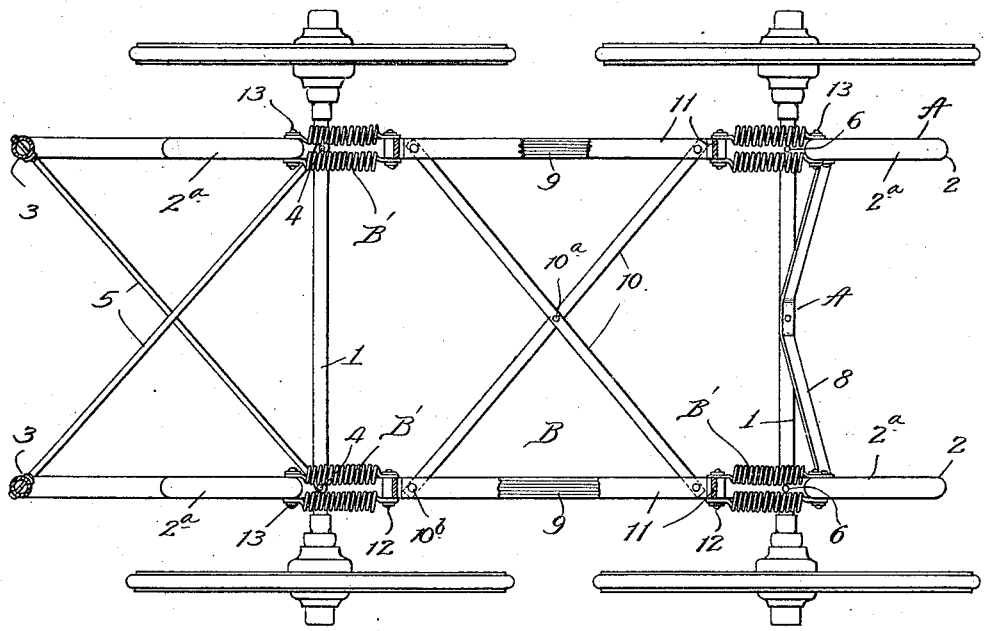
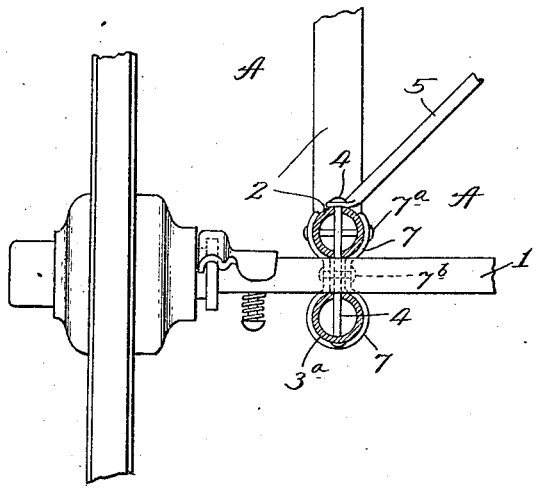
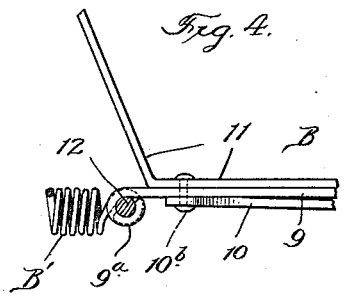

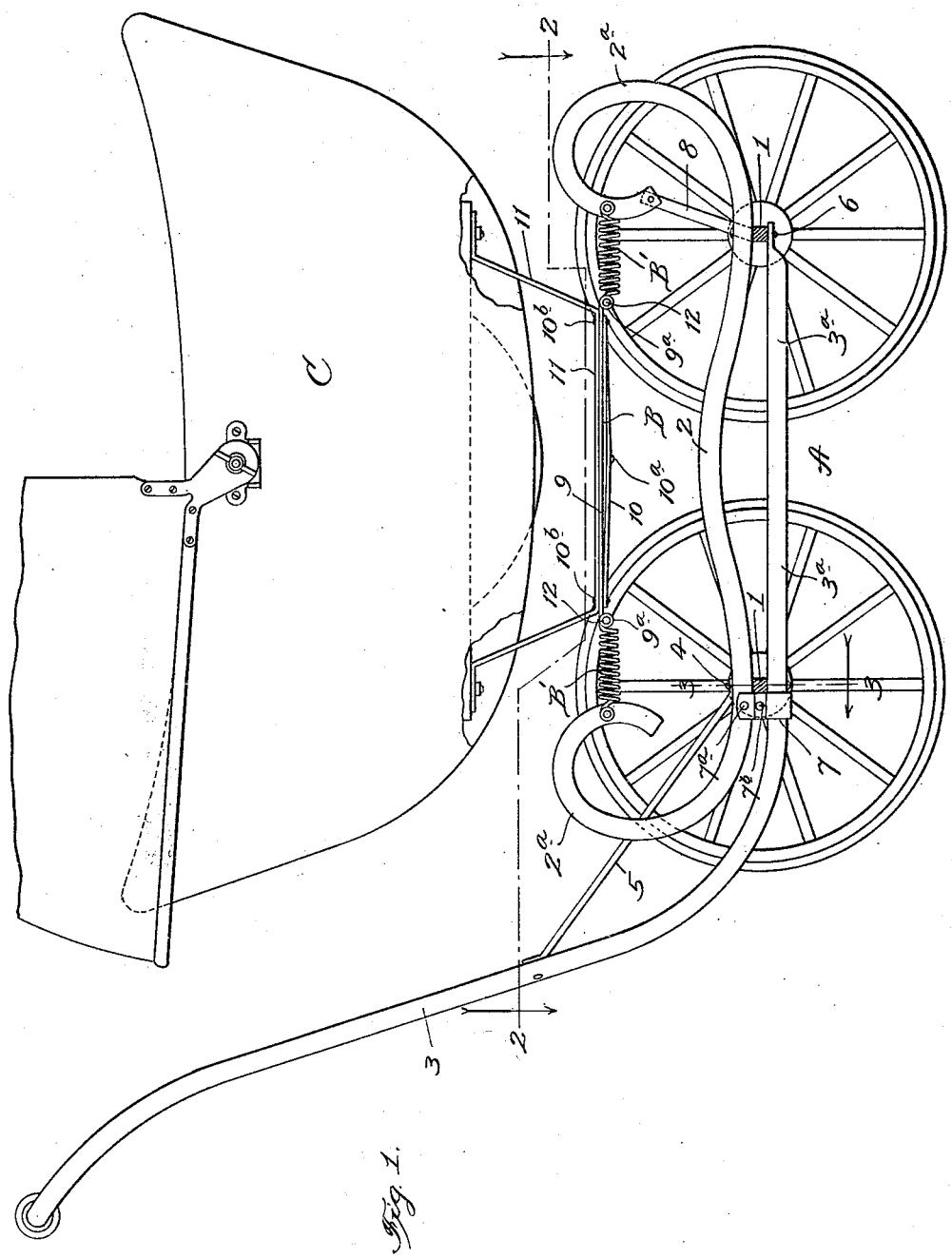

UNITED STATES PATENT OFFICE.

ARTHUR J. ADAMS, OF BAY CITY, MICHIGAN, ASSIGNOR, BY MESNE ASSIGNMENTS, TO FERRIS-STEVENSON CORPORATION, OF BUFFALO, NEW YORK, A CORPORATION OF NEW YORK.

PERAMBULATOR OR BABY-CARRIAGE.

1,271,986.      Specification of Letters Patent.      Patented July 9, 1918.

Application filed May 22, 1917. Serial No. 170,165.

*To all whom it may concern:*

Be it known that I, ARTHUR J. ADAMS, a citizen of the United States, residing at Bay City, in the county of Bay and State of Michigan, have invented a new and useful Improvement in Perambulators or Baby-Carriages, of which the following is a specification.

This invention relates particularly to the running-gear and body suspension means of baby carriages; and the primary object is to provide a strong and durable running-gear construction and spring suspension for the body, which is both durable and delicately hung, so as to yield readily to dissipate even slight shocks encountered in the use of the vehicle.

The invention is illustrated in its preferred embodiment in the accompanying drawings, in which—

Figure 1 represents a broken side elevation of a baby carriage embodying my improvements, the axles being shown in section and the wheels at one side removed; Fig. 2, a plan sectional view taken as indicated at line 2 of Fig. 1; Fig. 3, a broken vertical section taken as indicated at line 3 of Fig. 1; and Fig. 4, a broken side elevational view of a spring-suspended body-supporting frame employed.

In the construction, A represents the running-gear of the vehicle; B, a body-supporting frame suspended on the running-gear frame through the medium of springs B'; and C, a body mounted on the frame B.

In the preferred construction, the running-gear A comprises a pair of axles 1; a pair of longitudinal reach-members 2 rigidly mounted on and connecting said axles, the reach-members 2 being provided at their extremities with upward extensions, or goose-necks, 2ª, which afford suspension members to which the suspension springs B' are attached; and a handle 3 whose side-members are extended forwardly beneath the axles, thus affording supplemental reach-members 3ª.

The reach-members 2 are preferably tubular members which are bowed upwardly at a point midway between the axles, and whose extremities project past the axles, and are so curved as to give the goose-necks 2ª a graceful formation, forming a part of a design which gives the running-gear a pleasing appearance.

The handle 3 has its side-members formed of tubing, the lower portions of said members being curved forwardly and provided with substantially horizontal straight extensions which form the supplemental reach-members 3ª.

The rear axle is interposed between the rear portions of the members 2 and the rear portions of the members 3ª, and said members are firmly secured to the rear axle by means of rivets 4, as shown in detail in Fig. 3. Diagonal braces 5 connect the side-members of the handle 3 with the rear axle, the lower front ends of said diagonal braces being secured to the upper ends of the rivets, or bolts, 4. The front portions of the reach-members 2 and supplemental reach-members 3ª embrace the front axle, and are secured thereto by rivets 6. The rear portions of the reach-members 2 and the supplemental reach-members 3ª are further connected, with a view to adding to the rigidity and strength of the running-gear frame, by clips 7, which are disposed immediately back of the rear axle. Each clip 7 preferably comprises a substantial metal strap curved at an intermediate point to embrace the lower reach-member 3ª, and having the extremities of its members extending upwardly and embracing the upper reach-member 2, the extremities of the clip being secured to the member 2 by a horizontal rivet 7ª. The clip, which is thus of general U-form, has the portions of its members which are disposed between the tubes spaced somewhat apart and united by a rivet 7ᵇ, as will be clearly understood from Fig. 3. Thus, it will be understood that the members 7 are firmly clamped to the tubes 2 and 3ª, as well as being united to the tubes 2 by means of the rivets 7ª. The extremities of the front goose-necks 2ª are shown connected to the front axle by means of a brace 8.

The frame B preferably comprises a pair of longitudinal metal bars 9; diagonal braces 10, which are connected at a central point by a rivet 10ª and have their extremities joined, by rivets 10ᵇ, to the longitudinal bars 9 near the extremities thereof; and body-supporting bars 11 having intermediate portions superposed upon the longitudinal bars 9, to which they are connected by means of the rivets 10b, the extremities of each bar 11 being bent upwardly and divergent from each other, and having the body C mounted thereon.

The extremities of the bars 9 are curved to afford eyes 9a which receive pins, or rivets, 12, with which the adjacent ends of the coil-springs B' are connected. The springs are preferably arranged in pairs at the four corners of the frame B, and have their other ends secured to rivets, or pins, 13, which extend through the goose-necks 2a. The springs B' are under some tension, and are substantially horizontal. With this arrangement, substantial springs may be employed, and nevertheless the body will be delicately suspended and capable of yielding in any direction at the slightest jar.

The construction described is simple, durable, may be manufactured at moderate cost, and affords delicate flexibility and resilience in the mounting of the body.

The foregoing detailed description has been given for clearness of understanding only, and no unnecessary limitation should be understood therefrom, but the appended claims should be construed as broadly as permissible, in view of the prior art.

What I regard as new, and desire to secure by Letters Patent, is:

1. In a vehicle of the character set forth, the combination with a pair of axles, of a pair of reach-members mounted on and connecting said axles and provided with upward extensions, a handle in rigid relation to the rear axle, a body, a body-supporting frame beneath said body, and connections between said frame and said upward extensions, including a pair of coil-springs disposed wholly below the body.

2. In a vehicle of the character set forth, the combination with a pair of axles, of a pair of reach-members mounted on and connecting said axles, a handle having members provided with extensions disposed below said axles, affording supplemental reach-members between said axles, suspension members extending above the axles and rigid therewith, a body-supporting frame, and connections between said frame and said suspension members, including a pair of suspension coil-springs.

3. In a structure of the character set forth, the combination with a pair of axles, of a pair of reach-members mounted on and connecting said axles and equipped with goose-neck extremities disposed above said axles, a handle having members provided with horizontal extensions, affording supplemental reach-members disposed beneath the axles, means rigidly uniting said reach-members to the axles and supplemental reach-members, coil-springs having extremities connected to said goose-necks, and a body equipped with supporting means suspended between said coil-springs.

4. In a structure of the character set forth, the combination of a pair of axles, reach-members rigidly connected with said axles, suspension members extending above said axles and rigidly connected therewith, a body-supporting frame comprising a pair of longitudinal bars and braces uniting the same, said frame having upwardly extending body-supports, tension-springs interposed between said frame and said suspension members, and a body mounted on said supports above the plane of said frame.

5. In a structure of the character set forth, the combination of a pair of axles, reach-members rigidly connecting said axles and provided with upward extensions, a horizontal body-supporting frame equipped at its front and rear portions with upwardly-extending members, a body mounted on said upwardly-extending members, and tension-springs interposed between said frame and the upward extensions of said reach-members and disposed wholly below the body.

6. In a structure of the character set forth, the combination of a pair of axles, a pair of reach-members disposed above said axles and equipped with upward extensions affording suspension members, a handle having members provided with forward extensions disposed beneath said axles and affording supplemental reach-members, rivets uniting said reach-members to said axles and supplemental reach-members, clamping devices uniting said reach-members and supplemental reach-members, a body-supporting frame, suspension springs interposed between said frame and said suspension members, and a body mounted on said frame.

ARTHUR J. ADAMS.